(12) United States Patent
Rive et al.

(10) Patent No.: US 7,735,127 B1
(45) Date of Patent: Jun. 8, 2010

(54) METHOD AND SYSTEM FOR COMMUNICATING WITH A MANAGED SYSTEM LOCATED BEHIND A FIREWALL

(75) Inventors: Russell S. Rive, San Francisco, CA (US); Peter Joshua Rive, San Francisco, CA (US)

(73) Assignee: Dell Marketing USA, L.P., Round Rock, TX (US)

( * ) Notice: Subject to any disclaimer, the term of this patent is extended or adjusted under 35 U.S.C. 154(b) by 942 days.

(21) Appl. No.: 10/305,698

(22) Filed: Nov. 26, 2002

(51) Int. Cl.
*G06F 5/00* (2006.01)
*G06F 17/00* (2006.01)
(52) U.S. Cl. .......................... 726/12; 726/22
(58) Field of Classification Search .................... 726/11
See application file for complete search history.

(56) References Cited

U.S. PATENT DOCUMENTS

| | | | | |
|---|---|---|---|---|
| 5,491,796 A | * | 2/1996 | Wanderer et al. | 709/224 |
| 5,655,081 A | * | 8/1997 | Bonnell et al. | 709/202 |
| 5,699,513 A | * | 12/1997 | Feigen et al. | 726/11 |
| 5,996,010 A | * | 11/1999 | Leong et al. | 709/223 |
| 6,006,034 A | * | 12/1999 | Heath et al. | 717/170 |
| 6,009,274 A | * | 12/1999 | Fletcher et al. | 717/173 |
| 6,029,246 A | * | 2/2000 | Bahr | 726/4 |
| 6,145,001 A | * | 11/2000 | Scholl et al. | 709/223 |
| 6,282,711 B1 | * | 8/2001 | Halpern et al. | 717/175 |
| 6,286,041 B1 | * | 9/2001 | Collins et al. | 709/221 |
| 6,324,690 B1 | * | 11/2001 | Luu | 717/177 |
| 6,487,718 B1 | * | 11/2002 | Rodriguez et al. | 717/177 |
| 6,550,012 B1 | * | 4/2003 | Villa et al. | 726/11 |
| 6,553,422 B1 | * | 4/2003 | Nelson | 709/227 |
| 6,567,849 B2 | * | 5/2003 | Ludovici et al. | 709/223 |
| 6,654,892 B1 | * | 11/2003 | Karim | 726/11 |
| 6,742,039 B1 | * | 5/2004 | Remer et al. | 709/229 |
| 6,772,348 B1 | * | 8/2004 | Ye | 726/13 |
| 6,845,452 B1 | * | 1/2005 | Roddy et al. | 726/11 |
| 6,952,779 B1 | * | 10/2005 | Cohen et al. | 726/22 |
| 6,971,094 B1 | * | 11/2005 | Ly | 717/172 |

(Continued)

FOREIGN PATENT DOCUMENTS

FR   EP 1168711 A1 * 2/2002

OTHER PUBLICATIONS

IEEE 100, The Authoritative Dictionary of IEEE Standards Terms, 7th ed., 2000, IEEE Press, p. 207,208,470.*

(Continued)

*Primary Examiner*—Matthew B Smithers
*Assistant Examiner*—Jeffery Williams
(74) *Attorney, Agent, or Firm*—Schwegman, Lundberg & Woessner, P.A.

(57) ABSTRACT

A method and system for communicating with at least one managed system located behind a firewall are provided. The system includes an agent computer, located behind a firewall, to communicate with the at least one managed system and a management system. The management system communicates with the agent computer to provide computer related services. The management system is located on an opposed side of the firewall and communicates an envelope including at least one executable task to the agent computer for communication to the managed system. The executable task may be included in a script and the agent computer may poll the management system to determine if there is an envelope for it to receive.

31 Claims, 8 Drawing Sheets

U.S. PATENT DOCUMENTS

| | | | |
|---|---|---|---|
| 6,985,958 B2 * | 1/2006 | Lucovsky et al. | 709/230 |
| 6,988,102 B2 * | 1/2006 | Rossiter et al. | 707/10 |
| 7,092,995 B2 * | 8/2006 | Kaler et al. | 709/206 |
| 7,222,228 B1 * | 5/2007 | Stephens et al. | 713/1 |
| 7,266,822 B1 * | 9/2007 | Boudnik et al. | 718/100 |
| 2002/0149601 A1 * | 10/2002 | Rajarajan et al. | 345/619 |
| 2003/0074413 A1 * | 4/2003 | Nielsen et al. | 709/206 |
| 2004/0098446 A1 * | 5/2004 | Styles et al. | 709/200 |
| 2008/0040790 A1 * | 2/2008 | Kuo | 726/12 |

OTHER PUBLICATIONS

Gudgin et al., "SOAP Version 1.2 Part 1:Messaging Framework", 2002, W3C, p. 1-41.*

"Manageability Solutions for HP Blade Servers/Manage Multiple Servers in Multi-tiered, Multi-OS Environments", an HP White Paper (Jan. 2002), 25 pgs.

* cited by examiner

METHOD AND SYSTEM FOR COMMUNICATING WITH A MANAGED SYSTEM LOCATED BEHIND A FIREWALL

FIELD OF THE INVENTION

The present invention relates generally to the provision of computer related services. More specifically, the invention relates to a method and system for communicating with a managed system located behind a firewall.

BACKGROUND OF THE INVENTION

The deployment of computer systems in the workplace has become increasingly widespread, and computer systems have become indispensable tools for workers in most industries. The challenge of providing adequate management and support for such computer systems has paralleled this deployment. Organizations with more than a few computers may employ an Information Technology (IT) professional (e.g., an IT administrator) to manage computer systems and networks of the organization. An IT administrator is typically burdened with a large number of tasks and responsibilities relating to such computer systems and networks. For example, the IT administrator, and supporting staff, are typically responsible for the installation and set up of computer systems and networks within an organization, the upgrading and maintenance of installed computer systems, and responding to service requests from users within the organization.

Although technology has in recent years driven the cost of computer systems down, service and support costs continue to escalate. In addition, for an in-house IT administrator to install, maintain or upgrade software on multiple computers, the organization requires additional, relatively powerful, dedicated hardware and software on-site. This additional hardware and software results in increased costs even though it may only be used infrequently. To enhance security, the computers of the organization are typically located behind a firewall and, accordingly, the additional hardware is also located on-site behind the firewall.

SUMMARY OF THE INVENTION

According to one aspect of the present invention, there is provided system for communicating with a managed system located behind a firewall, the system including:

an agent computer to communicate with the at least one managed system, the agent computer being located behind the firewall; and a management system to communicate with the agent computer, the management system being located on an opposed side of the firewall to communicate an envelope including at least one executable task to the agent computer for execution on the managed system.

According to a further aspect of the invention, there is provided a method of communicating with at least one managed system located behind a firewall, the method including:

receiving an envelope at a agent computer located behind the firewall, the envelope being communicated from a management system on an opposed side of the firewall;

extracting a task from the envelope at the agent computer; and communicating task to the managed system for execution.

The invention extends to a machine-readable medium storing a sequence of instructions that, when executed by a machine, cause the machine to execute a method of communicating with at least one managed system located behind a firewall.

Further according to the invention, there is provided an agent computer for managing at least one managed system located behind a firewall, the agent computer including:

a polling module to poll a management system located on an opposed side of the firewall to communicate an envelope to the agent computer; and an interpretation module to extract a task from the envelope and communicate the task to the managed system for execution According to a further aspect of the invention, there is provided a management system for managing at least one managed system, the management system including:

a control center at which a plurality of tasks to be executed on the managed system are defined; and an envelope generator to generate an envelope including at least one of the plurality of tasks, the envelope being communicated via an agent computer to the at least one managed system in response to a communication from the agent computer to the control center.

According to a yet further aspect of the invention, there is provided a method of managing at least one managed system, the method including:

initiating at a control center a plurality of tasks to be executed on the managed system;

generating at the control center an envelope including at least one of the plurality of tasks; and communicating the envelope to an agent computer in response to a communication from the agent computer to the control center.

Other features of the present invention will be apparent from the accompanying drawings and from the detailed description, which follows.

BRIEF DESCRIPTION OF THE DRAWINGS

The present invention is illustrated, by way of example, and not limitation in the figures of the accompanying drawings, in which like references indicate similar elements.

In the drawings.

DETAILED DESCRIPTION

A method and system for communicating with a managed system located behind a firewall are described. In the following description, for purposes of explanation, numerous specific details are set forth in order to provide a thorough understanding of the present invention. It will be evident, however, to one skilled in the art that the present invention may be practiced without these specific details.

Figure 1:
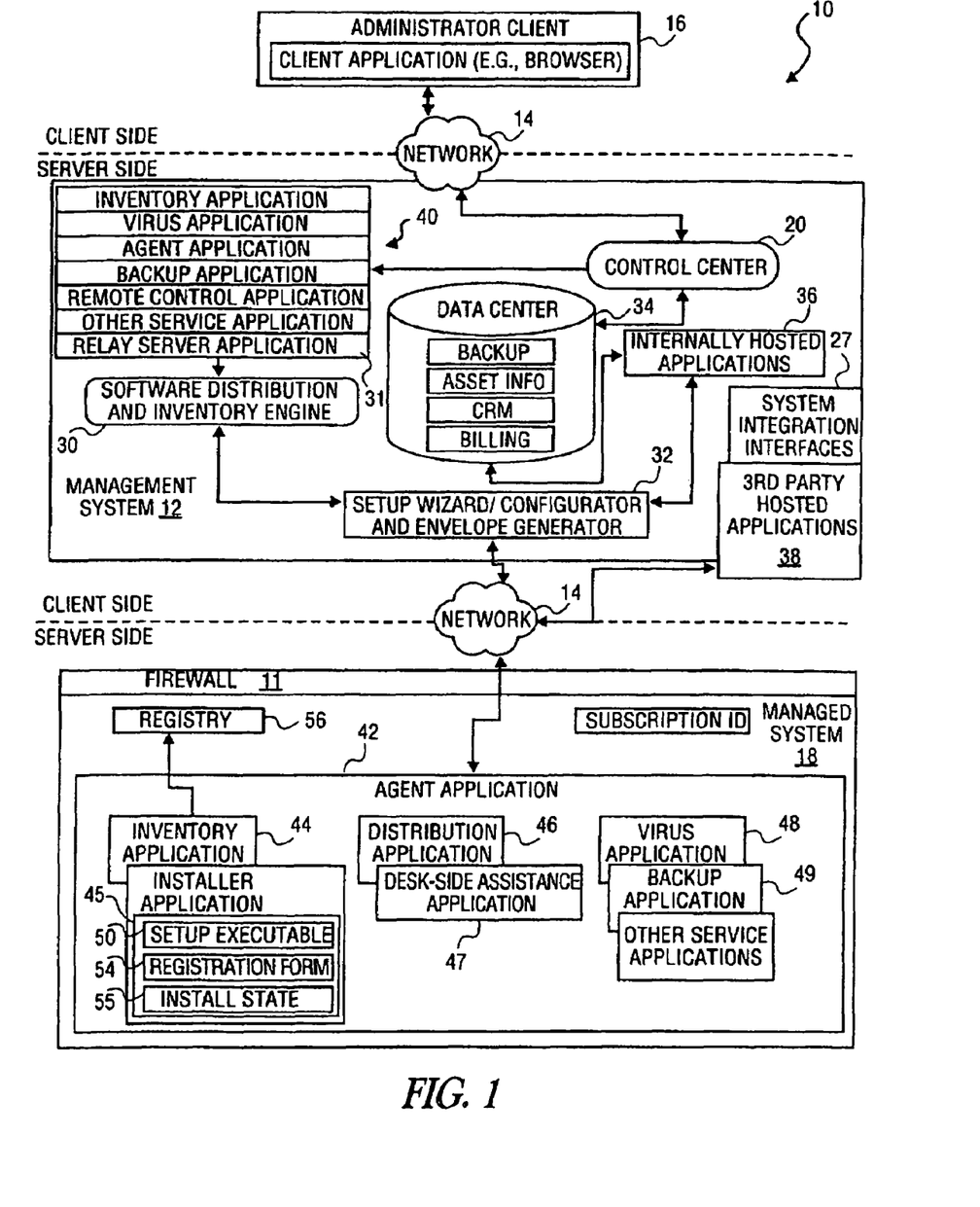
FIG. 1 is a block diagram illustrating a system, according to an exemplary embodiment of the present invention, to manage services for multiple managed computer systems.

FIG. 1 is a block diagram illustrating a system 10, according to an exemplary embodiment of the present invention, to manage services for multiple managed computer systems. Included within the exemplary system 10 is a management system 12, which is optionally coupled by a network 14 (e.g., the Internet) to an administrator client 16 and one or more managed systems 18 located behind a firewall 11. In one embodiment, the managed systems 18 are located remotely from the management system 12 and only accessible via the firewall 11. The managed systems 18 may each be any one of a number of types of devices or systems including, but not limited to, a personal computer (PC), workstation, Personal Digital Assistant (PDA), set-top box (STB), cellular telephone, network device (e.g., switch, router, or bridge) or any other device capable of executing software.

In one embodiment, the management system 12 provides fault analysis, inventory analysis, security management, performance analysis, software upgrades or the like to any one or more of the managed systems 18 via an agent computer or relay server 15, as described in more detail below. Thus, the management system 12 may include a number of applications and engines integrated into a single framework that utilizes an open architecture and industry standards to provide an Information Technology (IT) management platform. Service applications may be hosted at an operator of the management system 12 (e.g., a Managed Service Provider (MSP)), or may be hosted by a third-party vendor. The management system 12, in one embodiment, utilizes web services (e.g., the Simple Object Application Protocol (SOAP)), to facilitate systems integration.

Figure 2:
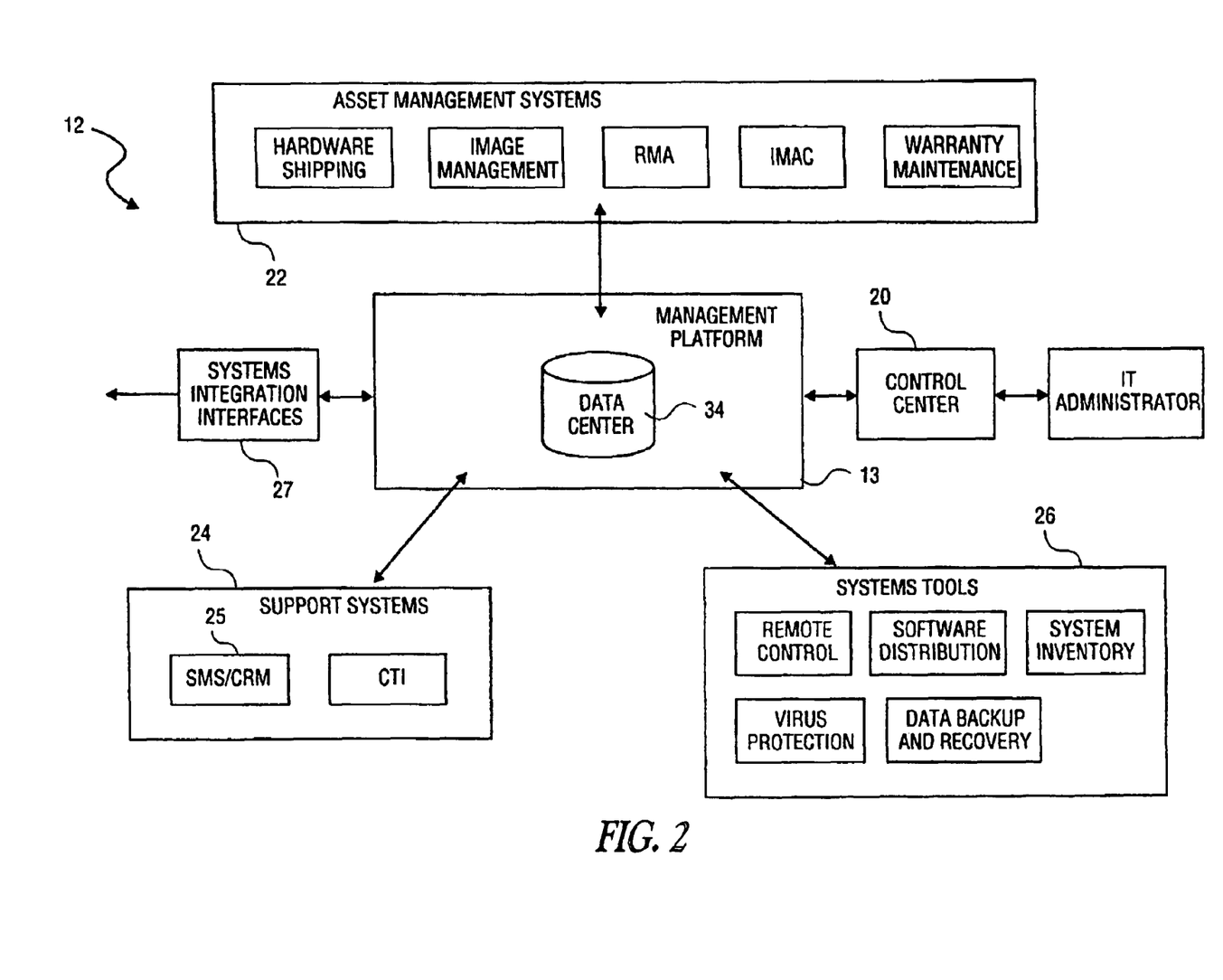
FIG. 2 is a block diagram illustrating a conceptual representation of the management system, according to an exemplary embodiment of the present invention.

FIG. 2 is a block diagram illustrating a conceptual representation of the management system 12, according to an exemplary embodiment of the present invention. The system 12 may conceptually be viewed, in one exemplary embodiment, as providing asset management systems 22 that provide access to a range of asset management functions, and support systems 24 to assist IT professionals in providing and managing services to managed systems 18. The asset management functions provided by the asset management systems 22 may include physical asset (e.g., hardware and software) information (e.g., location, asset inventory, etc.), financial information (e.g., procurement, ownership) and warranty/service information (e.g., entitlements, service history, etc.).

Turning now specifically to the support systems 24, in one exemplary embodiment, the support systems 24 assist an IT professional (e.g., a solutions analysis) in providing service in two areas, including service request management and telephony systems. The support systems 24 are shown in FIG. 2 to include a service management system 25, or a Customer Relationship Management (CRM) system, to manage service requests and service workload. The CRM system may operate as a subscription component and be updated to reflect an entitlement (e.g., as a result of a subscription agreement) of a particular managed system 18 to a number of service applications 40 (see FIG. 1), responsive to a distribution request.

The service management system 25 may be utilized to service requests for compliance with a service level agreement and also to provide managers with relevant statistics (e.g., problem resolution times, open service requests, etc.). In addition, custom workflow rules may be defined within a graphical environment to create appropriate responses for a range of situations.

The telephony infrastructure of the management platform 13 (e.g., Computer Telephony Integration (CTI) infrastructure) may facilitate any number of features, such as real-time fail-over across distributed call centers, detailed call metrics at granular levels, Computer Telephony Integration (CTI) for call center efficiency, centralized call routing rules, and custom Interactive Voice Recognition (IVR) on a per number basis.

System tools 26, in one embodiment, reside on the managed system 18 and are responsible for a number of services to the managed systems 18 (e.g., self-maintenance, system protection and disaster recovery). The system tools 26 may be utilized by an end user of the managed system 18 or by support staff of a managed service provider to assist in problem resolution. Two exemplary system tools 26 that may be provided are data back-up and recovery, and virus protection. As described in more detail below, the system tools 26 may be run by communicating an envelope from the management system 18 to the managed system 18 whenever the envelope identifies a task to be performed by the system tools 26.

Returning now to the high-level architectural representation of the system 10 provided in FIG. 1, a more detailed description of the architecture will now be provided. The management system 12, in one exemplary embodiment, is shown to include the control center 20, a software distribution and inventory engine 30, a configurator 32, a data center 34, a collection of internally-hosted applications 36, and system integration interfaces 27 that enable access to one or more third-party hosted applications 38.

Considering first the control center 20, in one exemplary embodiment the control center 20 includes a secure web application that allows an IT professional (e.g., an administrator) to specify, configure, and view services that are being delivered to multiple managed systems 18. For example, the control center 20 may allow an IT professional to access desktop and service data operations, e.g. to perform system diagnostics queries, initiate operating system tasks, or the like. Analytical services and reports are driven off data stored in the data center 34, which collects data from multiple applications within the management system 12 and stores the collected data in a database scheme suited for standard and custom reports. Included in the data center 34 are scripts included in an envelope for communication by the management system 12 to the relay server 15, as described in more detail below. In one embodiment, application servers and databases that constitute the control center 20 reside behind a firewall (not shown) and are secured by data segregation, user authentication, and secure data transport (e.g., HTTPS).

The control center 20 may enable an IT professional to manage assets and services by issuing queries across system inventory (e.g., hardware, software and services (e.g., network access)), users, physical location and cost centers, manage software licenses, and access new system rollout information. An IT professional may also query service request information (e.g., response times), and update and create service requests. In addition, the control center 20 allows an IT professional to manage deployment of an agent application 42 to multiple managed systems 18 and to create new deployment configurations. The control center 20 also provides reporting and administrative capabilities to an IT professional. For example, the control center 20 is able to generate graphical reports, and also to deliver exportable data for additional analysis. In order to perform these services to the managed system 18 residing behind the firewall 11, the relay server 15 is provided to receive envelopes including the tasks that are sent, in one embodiment from the control center 20.

In summary, an IT professional can log into the control center 20, and view the status of multiple managed services, and remove and modify selected services from selected managed systems 18. In one embodiment, the IT professional may accomplish this by authoring appropriate scripts which are sent to the relay server 15 for execution.

FIG. 1 shows the control center 20 as communicating a service input, received from an IT professional, that identifies a number of services (each of which may be enabled by a respective application (or package) 40) to the software distribution and inventory engine 30.

The software distribution and inventory engine 30, responsive to group and services inputs, identifies and communicates to the configurator 32 a collection of service applications, which enable the provision and management of services, to be installed on one or more managed systems 18 as "components" of the agent application 42. The configurator 32, in one embodiment, operates to manage the configuration of the services subscribed by, and delivered to, a managed system 18. To this end, an agent application 42, installed on each managed system 18, operates in conjunction with the configurator 32. Specifically, at an initial registration of a new managed system 18, the configurator 32 runs a "setup wizard" or setup executable 50 to gather information regarding the managed system 18 (e.g., user information), and creates an account with which the managed system 18 is associated. Multiple managed systems 18 may be associated with the single account of an IT professional (e.g., an administrator). The configurator 32, following initial registration, also downloads the setup executable 50 to the managed system 18, whereafter communications can be established between the configurator 32 and the setup executable 50 for the purposes of configuring and installing further services. As is described, the configurator 32 receives a list of services that are to be managed from the control center 20 using, in one embodiment, the relay server 15 which may be a so-called "thin client".

Following completion of an initial installation, should an IT professional (e.g., an administrator) request additional services to be installed on the managed system 18, the configurator 32 operates to install and register the appropriate services. The configurator 32 receives an instruction that consists of a system identifier and services that need to be installed on the managed system 18 from the control center 20, as inputted by IT professional. In one embodiment the configurator generates the envelope including the tasks for execution on a managed system 18.

The configurator 32 allows for service configuration applications, (or service applications) shown in FIG. 1 to form part of the agent application 42, to be incorporated within the agent application 42. Such service applications may include, for example, back-up, virus protection, email, Internet connectivity and desk-side assistance/customer service applications. Each application, in one embodiment, includes the ability to create a new account on a service server that may host an application (e.g., an internally-hosted application 36 or a third-party hosted application 38).

Once an account is created on a service server, the appropriate service is installed and configured on the managed system 18. To this end, an appropriate service application 40 is sent to the managed system 18 (e.g., by sending a command line from the control center 20 to the software distribution and inventory engine 30 to send the appropriate application or package to the managed system 18 via the configurator 32). In one embodiment, the software distribution and inventory engine 30 sends a relay server application 31 to the relay server 15 for polling the management system 12 and receiving an envelope and processing the contents thereof.

Once the appropriate service application 40 is downloaded, the configurator 32 configures the service application 40 to conform to the account that it previously created on the service server. When the control center 20 queries the databases of the service server that includes the account information, the control center 20 automatically detects that a new service has been stored on a managed system 18, and indicates this installation. The control center 20 is also responsible for advising a financial system (not shown) that a new service has been added to a managed system 18, and the appropriate account (e.g., an account associated with a particular administrator) will be recognized as the billing account for the newly installed service. While the provision and management of a service is described above as being facilitated by the installation and/or execution of an appropriately configured service application 40 on the managed system 18, it will be appreciated that certain services may not require such an installation and/or execution, and could be provided from a remote location and/or without a service application.

FIG. 1 also illustrates the data center 34 as maintaining information to support the asset management systems 22, the support systems 24, and the system tools 26, described above with reference to FIG. 2.

Figure 3:
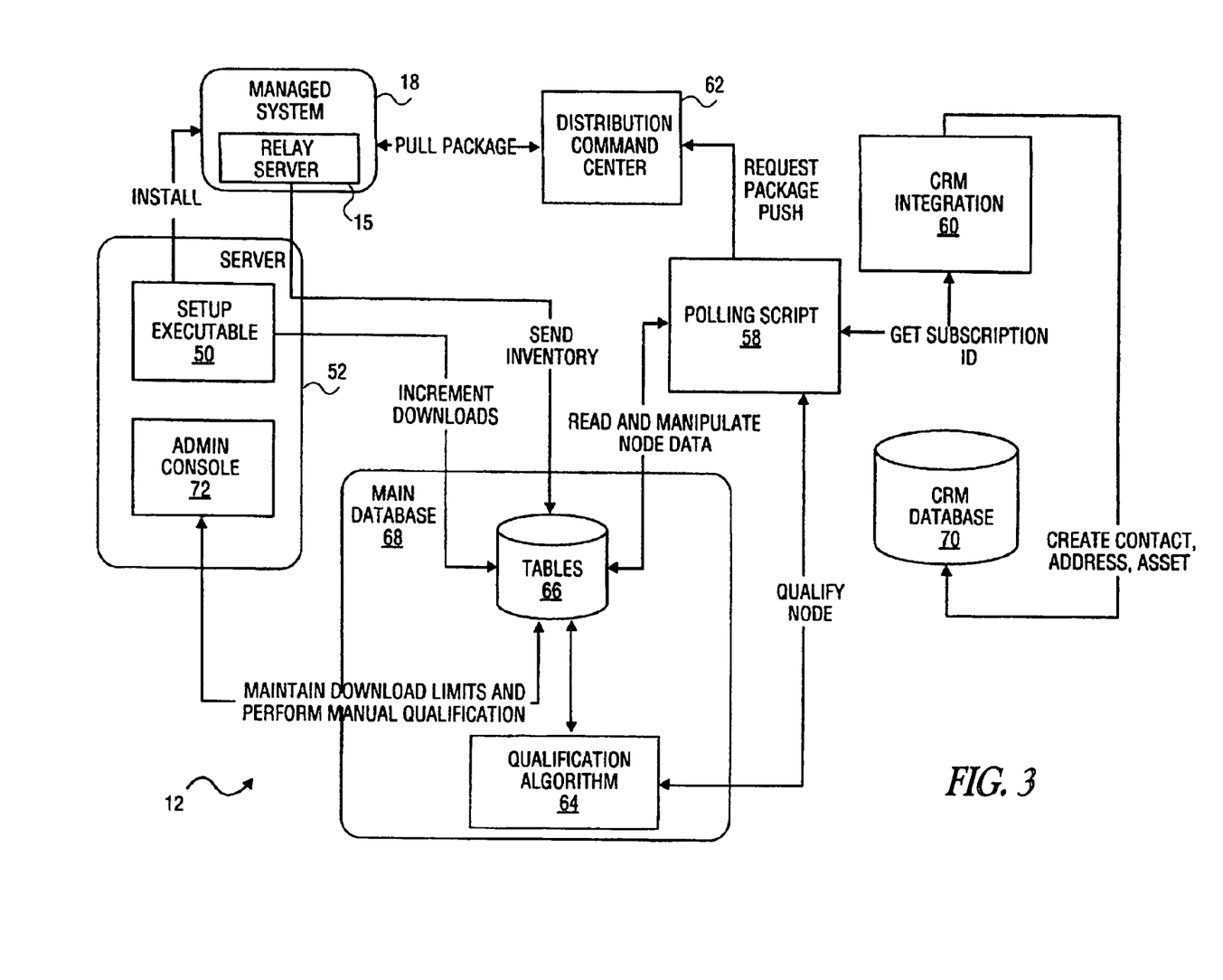
FIG. 3 is a block diagram illustrating further details of the software architecture (as opposed to the service architecture) of the management system, according to an exemplary embodiment of the present invention.

FIG. 3 is a block diagram illustrating further details of the software architecture (as opposed to the service architecture) of the management system 12, according to an exemplary embodiment of the present invention. The management system 12, illustrated in FIG. 3, operates to deploy and integrate a number of services to a managed system 18. Such services may be, in one exemplary embodiment, provided partially by an operator of the management system 12 and provided partially by third-party vendors.

The management system 12 may include a number of different components executing on different systems. It should be noted that the components illustrated in FIG. 3 are not necessarily physical components (e.g., which have interfaces accessible through an API), but may be components described for the purposes of facilitating understanding of exemplary software architecture. However, each of the components illustrated in FIG. 3 may ultimately be implemented in code within the management system 12.

The technology architecture of the management system 12, as illustrated in FIG. 3 and according to an exemplary embodiment, is a combination of third-party applications, C++ service applications, scripts (which may define tasks included in an envelope), stored procedures and active server pages. Each of the components illustrated in FIG. 3 will now be discussed in further detail.

A setup executable 50 is stored on a server 52, and is downloaded to and executes on a managed system 18 to install one or more service applications 40 (e.g., a distribution application 46, a desk-side assistance application 47, and an inventory application) on the managed system 18. For example, the distribution application 46 may be a software component developed by Mobile Automation (e.g., the Mobile Automation 2000 Enterprise Edition). The desk-side assistance application 47 may be supplied by Control-F1, or Microsoft Corp. (e.g., NetMeeting) and may include system diagnostic capabilities. In addition the setup executable 50 may operate to install a "help" window, and insert appropriate short cuts for assistance and information into a "Start Menu" on the managed system 18. In addition, in one embodiment, the setup executable 50 installs the relay server application 31 (see FIG. 1) on the relay server 15.

In one embodiment, the setup executable 50 is account-specific, in that every account has a different binary account number. Each account furthermore may have a finite number of downloads, which number is maintained in the data center 34. The setup executable 50, as described above, also displays a user registration form 54 to a user of the managed system 18 during installation, which takes control of and directs the setup procedure performed by the setup executable 50.

A polling script 58 monitors all new registrations of managed systems 18, obtains a subscription identifier from a CRM integration application 60, pushes packages (or applications) to support additional services to the managed system 18 via a distribution command center 62, and provides emails to a user of the managed system 18, or an appropriate administrator, regarding updates to the managed system 18. The obtaining of a subscription identifier by the polling script 58 is contingent on the managed system 18 qualifying to receive delivery of one or more services. To this end, the polling script 58 interacts with a qualification algorithm 64 to qualify a managed system 18. In one embodiment, the polling script 58 makes calls to the qualification algorithm 64 (e.g., a stored procedure). If the qualification succeeds, the subscription identifier is created and a services application 40 (or packages) is pushed to the managed system 18. The user of the managed system 18 is then sent an email including the subscription identifier associated with the managed system 18 and/or the user.

The qualification algorithm 64, in one exemplary embodiment, is a stored procedure that uses inventory information retrieved from a managed system 18 (e.g., inventory files and machine tables) in order to assess whether a managed system 18 qualifies for the provision and management of one or more services by the management system 12. For example, the inventory information may be matched against one or more qualification rules to determine whether the managed system 18 can be supported by the management system 12, and also whether one or more specific services can be provided and managed by the management system 12. To this end, different qualification rules may be associated with different services, depending upon the requirements to provide the respective services.

In one embodiment, the inventory information utilized by the qualification algorithm 64 to qualify a managed system may be stored in an appropriate table 66 within a main database 68 of the data center 34 (see FIG. 2). As discussed above, an inventory application 44 installed on the managed system 18 may, as part of the operations performed under the setup executable 50, harvest software, hardware and services (e.g., regarding existing services to which the managed system 18 has access) inventory information pertaining to the managed system 18. This information is then communicated to the management system 12 for storage within the table 66. Accordingly, the qualification algorithm 64 accesses this table 66 in order to obtain the inventory information to qualify the managed system 18. In an alternative embodiment, the qualification algorithm 64, in response to a request for qualification from the polling script 58, retrieves the inventory information directly from the managed system 18. In this case the inventory information is not necessarily stored within the main database 68. In the embodiment in which the inventory information is stored within table 66, the main database 68 may be regarded as including a central inventory database that is accessed by the qualification algorithm 64.

FIG. 3 also illustrates the management system 12 as including the CRM integration application 60 that is responsible for generation of a subscription identifier responsive to a request from the polling script 58. In one embodiment, the polling script 58 posts all fields for which information was received via the registration form 54 to an ASP page. The ASP page makes a call to a Java-built object, which inserts the information into a CRM database 70 associated with the CRM integration application 60.

The CRM integration application 60 is responsible for a generation of a subscription identifier, and also for the creation and maintenance of contact and account records for a customer of the management system 12. For example, a single customer (e.g., corporation) may have specific contact information, as well as a single account with which a number of managed systems 18 are associated.

It should also be noted that the installation of the agent application 42 may be tightly integrated with the CRM database 70 by the CRM integration application 60. Specifically, in certain embodiments, the CRM integration application 60 automatically generates "trouble tickets" at the management system 12 if any part of the installation and/or configuration process fails or experiences difficulties. In an exemplary embodiment, following the call from the ASP page, the ASP page returns a single string including the subscription identifier to a HTTP response buffer.

FIG. 3 also illustrates the server 52 as supporting an administrative console 72 that, according to an exemplary embodiment, includes a set of user interfaces that enable an administrator of the management system 12 to manage accounts and downloads, and manually to force qualification, for example. Specifically, in one embodiment, Active Server Pages (ASP's) constitute this component and allow an administrator within the management system 12 to maintain account downloads (e.g., set a maximum number of downloads, view a download log, etc.) and manually to force qualification for one or more managed systems 18 if such managed systems 18 were failed by the qualification algorithm 64. When a manual qualification is forced, the appropriate ASP updates appropriate tables 66 within the main database 68 to indicate the qualification. The polling script 58 then recognizes the manually forced qualification, and sends the appropriate services application 40 to the appropriate managed system 18.

Regarding the various services that may be delivered to, and managed for, a managed system 18, the provision and management of each service may be facilitated by the installation of an appropriate service application 40 on the managed system 18. Each of the service applications 40 may include a dedicated installer, and be distributed either as part of an initial setup, or may be pushed to the managed system 18 subsequent to qualification of the managed system 18. The subsequent pushing of a service application 40 to the managed system 18 may be part of an initial configuration operation performed by the management system 12, or as part of a subsequent request from a customer for installation and/or provision of the relevant service. It should also be noted that, in one embodiment, the installation of service applications 40 might require administrative privileges under an operating system of the managed system 18. Specifically, the administrative privileges that may be required are privileges to write to a disk drive of the managed system 18, to install an application, to update a registry file, and to create services on the managed system 18.

Figure 4:
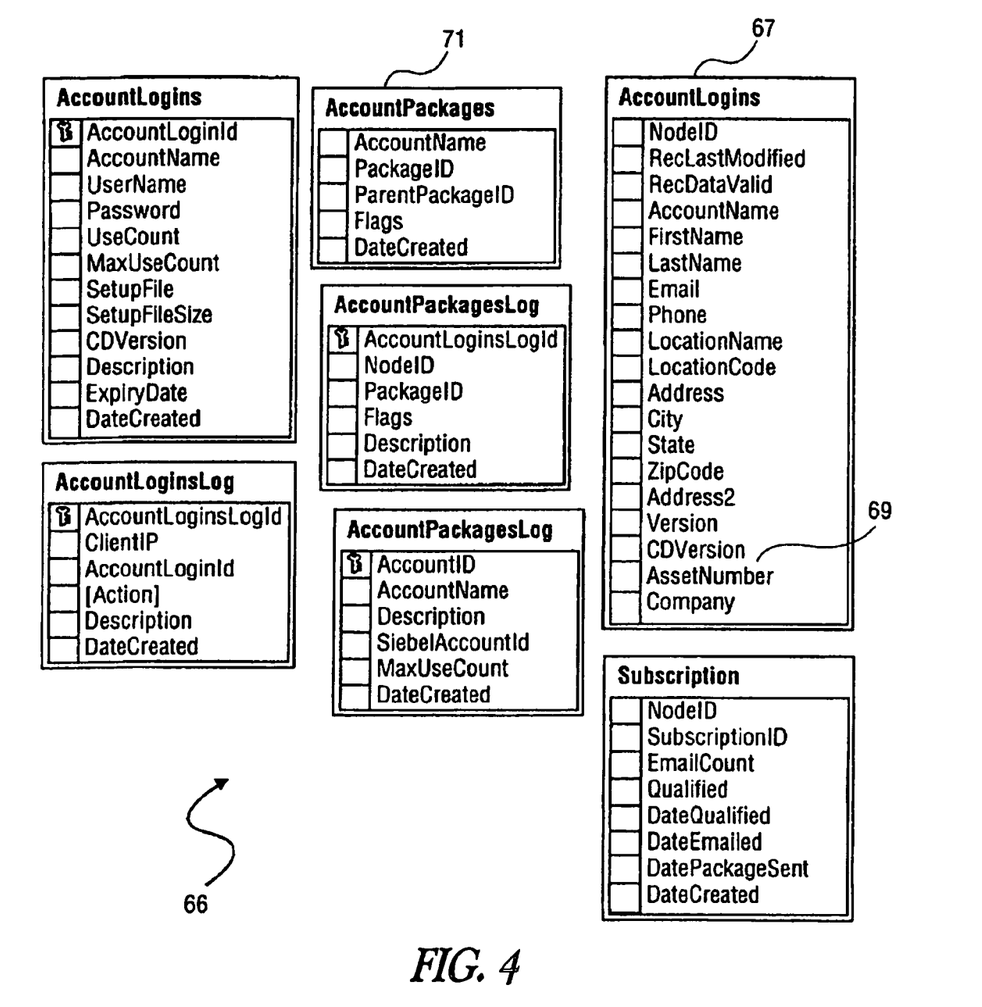
FIG. 4 is a database schema diagram illustrating exemplary tables that may be maintained within a main database so as to enable the management system to manage multiple managed systems and to provide services to the managed systems for disparate service providers.

FIG. 4 is a database schema diagram illustrating exemplary tables 66 that may be maintained within the main database 68 so as to enable the management system 12 to manage multiple managed systems 18 and the provision of services to the managed systems 18 for disparate service providers. The inventory application 44 may populate a registry asset information table 67 included within the table 66 to associate asset numbers 69 with each managed system 18, each asset number 69 identifying a particular software or hardware asset. An account packages table 71 maintains a record of service applications 40 that have been distributed to, and installed on, one or more managed systems 18 associated with a particular account.

Figure 5:
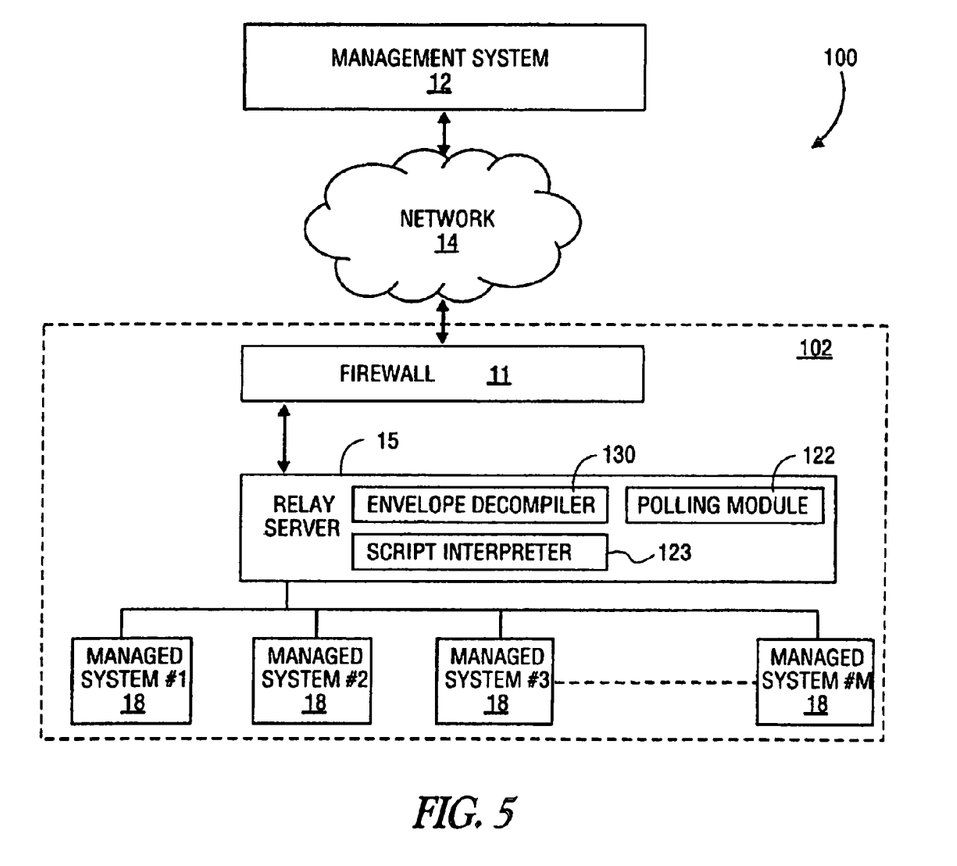
FIG. 5 is a schematic block diagram illustrating basic hardware components used in one embodiment of the invention.

Referring in particular to FIG. 5 of the drawings, reference numeral 100 generally indicates basic hardware components of the system 10 that are used for communicating with a plurality of managed systems 18. The hardware components 100 are shown to include the management system 12, the network 14, and a plurality of other components located at an organization or customer installation 102. In one embodiment, the components located at the customer installation 102 include, inter alia, the firewall 11, the relay server 15, and the plurality of managed systems 18 which, for example, may be a variety of different computing devices. In order for the management system 12 to provide the managed services described herein to the managed systems 18 in a secure fashion, communication takes place via the firewall 11. To this end, in one embodiment, the relay server 15 receives an envelope 104 (see FIG. 6) which it then processes and relays tasks included in the envelope 104 to an identified managed system 18.

Figure 6:
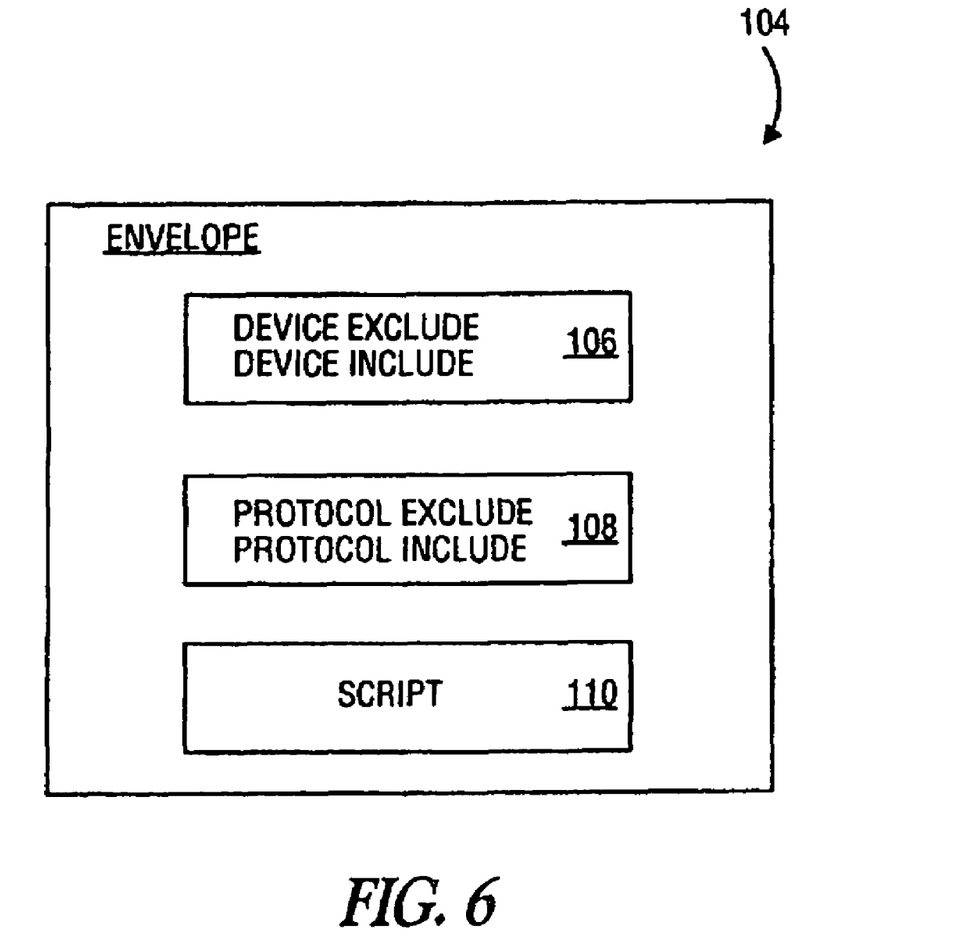
FIG. 6 is a schematic representation of an envelope communicated between the management system and a agent computer at the managed systems.

The envelope 104 includes device parameters 106, protocol parameters 108, and a script 110 for execution on a managed system 18 which is identified in the envelope 104. In certain embodiments, the envelope 104 may include tasks in the form of scripts for execution on multiple managed systems 18 and, accordingly, the device parameters 106 include a "device include" identifier which identifies all devices to which the script 110 is to be sent. Likewise, the device parameters 106 also include a "device exclude" identifier which identifies those manages systems 18 that are excluded when executing a task or tasks included in the envelope 104. In a similar fashion, the protocol parameters 108 include a "protocol exclude" identifier and a "protocol include" identifier which, respectively, define which protocols are excluded or included when the relay server 15 communicates with each particular managed system 18. Accordingly, in one embodiment, communication between the relay server 15 and the managed systems 18 may take place using different protocols. Exemplary protocols are SNMP, COM+, and RPL. In certain embodiments, the relay server 15 converts from one protocol to another allowing the management system 12 to communicate with the relay server 15 using one protocol, and the relay server 15 to communicate with a different managed systems 18 using different protocols. The protocols may be defined by the protocol parameters 108 in the envelope 104.

In certain embodiments, the relay server 15 includes reference device data and reference protocol data. The reference data allows the customer to control or define which particular managed systems 18 may be accessed by the management system 12. For example, in certain circumstances, the customer may wish to deny access by the management system 12 to a managed system 18 including financial or accounting details of the particular customer. Thus, in one embodiment, the device parameters 106 may be used to define which systems within the customer installation 102 are managed and those which are not managed by the management system 12.

Figure 7:
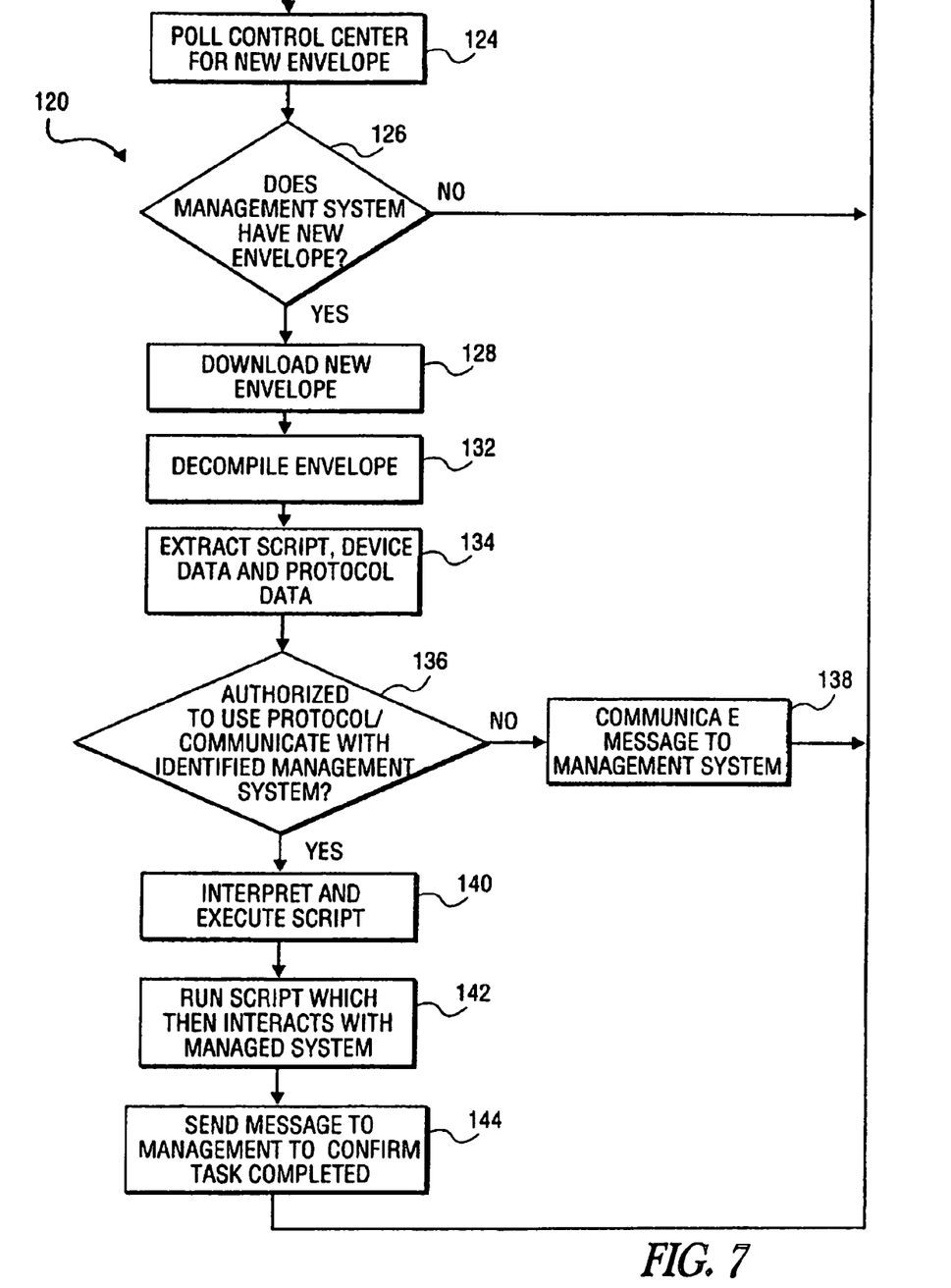
FIG. 7 is a flow diagram of a method, in accordance with an exemplary embodiment of the present invention, for communicating with a managed system located behind a firewall.

Referring in particular to FIG. 7, reference numeral 120 generally indicated a method, according to an exemplary embodiment of the present invention, for communicating with a managed system located behind a firewall. As discussed above, the relay server application 31 is, at set-up, installed on the relay server 15 and includes various modules for carrying out the exemplary method 120. In particular, the relay server application 31 includes a polling module 122 (see FIG. 5) which periodically polls the management system 12 (see block 124 in FIG. 7) to ascertain whether or not the management system 12 has an envelope 104, including new tasks for execution on the managed system 18 as shown at decision block 126. If the management system 12 does not have a new envelope 104 for the relay server 15, then the method returns to block 124 for subsequent polling of the management system 12.

However, if the management system 12 does have a new envelope for the relay server 15, and thus tasks to be executed on the managed systems 18, then the method 120 downloads the new envelope at block 128. In the embodiment depicted in the drawings, the management system 12, in particular the control center 20, secures the envelope at a network level to ensure secure communication between the management system 12 and the relay server 15. In particular, in one embodiment, the management system 12 at the network level compiles the envelope 104 and, accordingly the relay server 15 includes a envelope decompiler 130 (see FIG. 5). The method 120 then at block 132 decompiles the envelope 104 to extract, as shown at block 134, the device parameters 106, the protocol parameters 108, and the script 110. It is however to be appreciated that the envelope 104 may contain further data to enable the management functions as described above, to be carried out by the management system 12 on each managed system 18.

After the extraction of the information included in the envelope 104, the method 120, as shown at decision block 136, checks the device parameters 106 with the reference data to determine whether or not the management system 12 is authorized to access the particular managed system 18. If the management system 12 is not authorized, then a message is communicated at block 138 by the relay server 15 to the management system 12 and the method 120 then returns to block 124 where it periodically polls the management system 12 for a further envelope 104. If, however, the management system 12 is authorized to access the particular managed system 18, as shown at block 140, the script 110 is then interpreted and executed and the tasks included in the envelope 104 are performed on the managed system 18 as shown at block 142. To this end, the relay server 15 has a script interpreter 123. In one embodiment, the script interpreter 123 provides built-in access to common LAN-based network protocols such as SNMP, COM+ and WMI.

As mentioned above, the envelope 104 may identify one or more managed systems 18 on which the script 110 is to be run. It will be appreciated that the script 110 may include tasks that perform any management functions on the managed systems 18, for example, the management functions mentioned above.

Once the script 110 has been executed and the tasks performed on the managed system 18, the results, if necessary, are then communicated to the management system 12 via the relay server 15. As shown at block 144, in one embodiment, the script interpreter 123 communicates a completion message to the control center 20 to confirm execution of the tasks. An appropriate message may then be displayed to the technical support person or IT professional.

The scripts 110, in certain embodiments, may be standard scripts which are stored in the data center 34 at the management system 12. However, the scripts 110 may also be authored at the control center 20, as and when necessary.

After a script has been authored it is then included in an envelope 104 and queued or scheduled for communication to the managed system 18. When the relay server 15 polls the management system 12, as shown at block 124, the envelope 104 including the script is then communicated to the relay server 15.

As mentioned above, in one embodiment, the envelope 104 is communicated between the control center 20 and the relay server 15 in a secure fashion. For example, the envelope 104 may be encrypted at the management system 12 and decrypted by the relay server 15. In one embodiment, the envelope is encrypted using secure sockets layer (SSL) techniques. The envelope 104 may include IP addresses and MAC addresses of the managed systems 18 to be managed.

It is to be appreciated that the managed systems 18 may be any client computing device such as, but not limited to, file and print servers, database servers, application servers, desktop computers or the like. In certain embodiments no additional or dedicated applications are provided on the managed systems 18 and direct connections via an organization network may link the relay server 15 to one or more managed systems 18.

Figure 8:
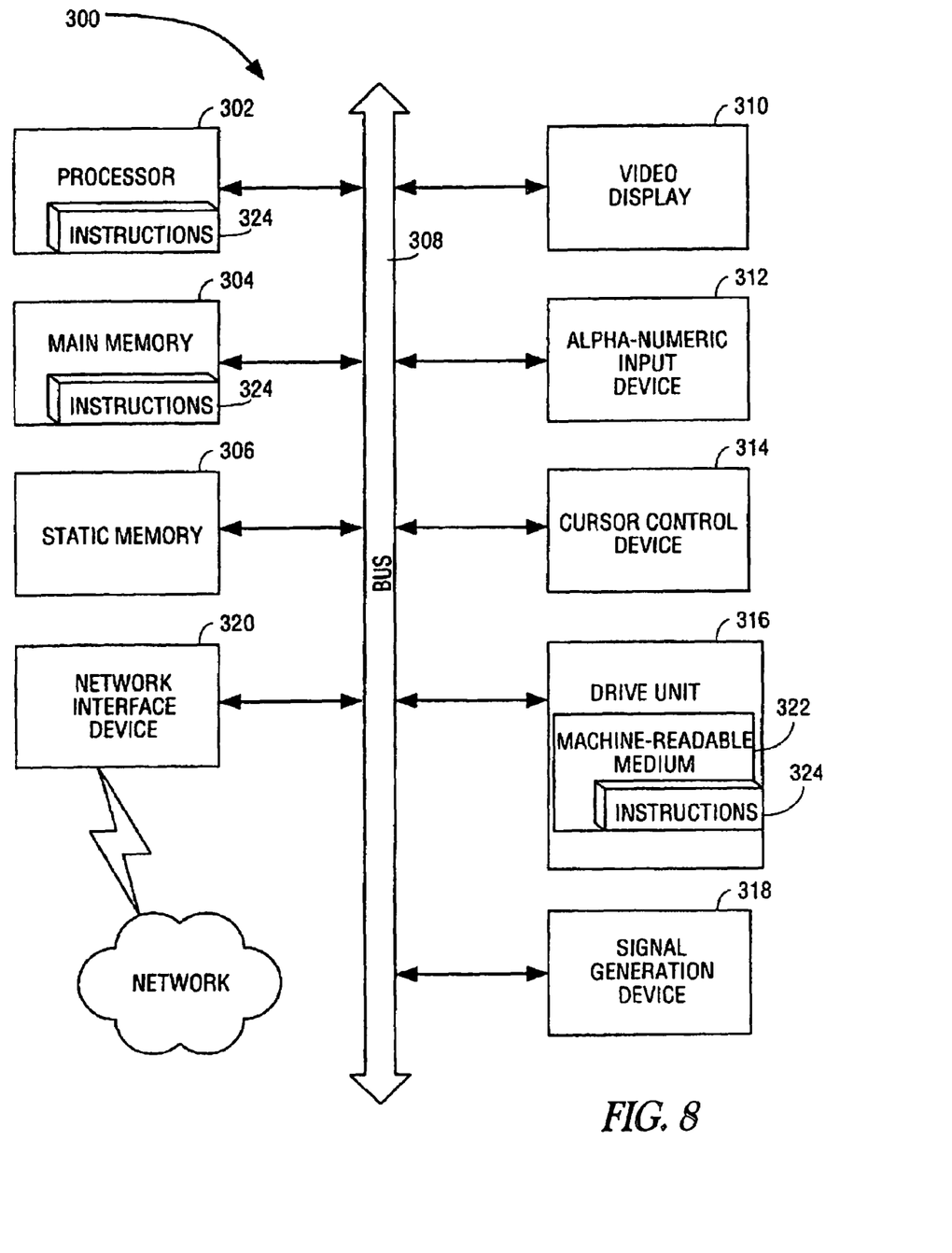
FIG. 8 illustrates a diagrammatic representation of machine in the exemplary form of a computer system within

FIG. 8 shows a diagrammatic representation of machine in the exemplary form of a computer system 300 within which a set of instructions, for causing the machine to perform any part of one or more of the methodologies discussed above, may be executed. In alternative embodiments, the machine may comprise a network router, a network switch, a network bridge, a set-top box (STB), Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored a set of instructions (software) 324 embodying any one, or all or part, of the methodologies or functions described herein. The software 324 is also shown to reside, completely or at least partially, within the main memory 304 and/or within the processor 302. The software 324 may further be transmitted or received via the network interface device 320. For the purposes of this specification, the term "machine-readable medium" shall be taken to include any medium that is capable of storing, encoding or carrying a sequence of instructions for execution by the machine and that cause the machine to perform any one of the methodologies of the present invention. The term "machine-readable medium" shall accordingly be taken to include, but not be limited to, solid-state memories, and optical and magnetic disks.

Thus, a method and system for communicating with at least one managed computer system, located behind a firewall, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system for communicating with a plurality of managed systems located behind a firewall, the system comprising:
   an agent computer communicatively coupled to the plurality of managed systems, the agent computer being external to the plurality of managed systems and located behind the firewall;
      the agent computer including a polling module to poll a management system periodically to determine if there is an envelope for the agent computer to receive;
   the management system to communicate to the agent computer the envelope including at least one executable task, the executable task to be executed on at least one of the plurality of managed systems, the management system being located on an opposed side of the firewall with respect to the agent computer and the plurality of managed systems;
   the agent computer including an interpretation module to extract the at least one executable task from the envelope, analyze contents of the envelope and, in response thereto, selectively communicate the at least one executable task to at least one of the plurality of managed systems using a communication protocol identified in the envelope; and
   the plurality of managed systems to receive from the agent computer the at least one executable task.

2. The system of claim 1, in which the executable task is included in a script for the agent computer.

3. The system of claim 1, in which the agent computer includes a script interpreter to execute the script.

4. The system of claim 1, in which the management system compiles the envelope at a network layer and the agent computer includes a decompiler to decompile the envelope prior to communicating the task to the at least one of the plurality of managed systems.

5. The system of claim 1, wherein the task comprises an executable file and the agent computer relays the executable file to the plurality of managed systems.

6. The system of claim 1, wherein the agent computer communicates a completion message to the management system after the task has been executed on at least one of the plurality of managed systems.

7. The system of claim 1, wherein the agent computer analyzes the contents of the envelope and, in response thereto, selectively denies and allows access to at least one of the plurality of managed systems identified in the envelope.

8. The system of claim 1, wherein the task is a system diagnostics query of the at least one of said plurality of managed systems, the results of the query being communicated to the management system via the agent computer.

9. A method of communicating with a plurality of managed systems located behind a firewall, the method comprising:
   periodically polling a management system by a polling module of an agent computer to determine if there is an envelope for the agent computer to receive;
   receiving the envelope at the agent computer located behind the firewall, the envelope being communicated from the management system on an opposed side of the firewall;
   extracting a task from the envelope at the agent computer;
   analyzing the envelope at the agent computer to identify a communication protocol; and
   selectively communicating the task to at least one of the plurality of managed systems for execution, using the communication protocol.

10. The method of claim 9, in which the executable task is included in a script for interpretation by the agent computer.

11. The method of claim 9, in which the management system compiles the envelope at a network layer, the method including decompiling the envelope at the agent computer prior to communicating the task to the plurality of managed systems.

12. The method of claim 9, wherein the task comprises an executable file, the method including relaying the executable file from the agent computer to at least one of the plurality of managed systems.

13. The method of claim 9, which includes the agent computer communicating a completion message to the management system after the task has been executed on at least one of the plurality of managed systems.

14. The method of claim 9, which includes the agent computer analyzing the contents of the envelope and, in response thereto, selectively denying and allowing access to at least one of the plurality of managed systems identified in the envelope.

15. The method of claim 9, wherein the task is a system diagnostics query of at least one the plurality of managed systems, the method including the agent computer communicating results of the query to the management system.

16. A machine-readable medium storing a sequence of instructions that, when executed by a machine, cause the machine to execute a method of communicating with a plurality of managed systems located behind a firewall, the method comprising:
    periodically polling a management system by a polling module of an agent computer to determine if there is an envelope for the agent computer to receive;
    receiving the envelope at the agent computer external to the plurality of managed systems and located behind the firewall, the envelope being communicated from the management system on an opposed side of the firewall;
    extracting a task from the envelope at the agent computer;
    analyzing the envelope at the agent computer to identify a communication protocol; and
    selectively communicating the task to at least one of the plurality of managed systems for execution, using the communication protocol.

17. The machine-readable medium of claim 16, wherein the executable task is included in a script for interpretation by the agent computer.

18. The machine-readable medium of claim 16, wherein the management system compiles the envelope at a network layer, the method including decompiling the envelope at the agent computer prior to communicating the task to at least one of the plurality of managed systems.

19. The machine-readable medium of claim 16, wherein the task comprises an executable file, the method including relaying the executable file from the agent computer to at least one of the plurality of managed systems.

20. The machine-readable medium of claim 16, wherein the method includes the agent computer communicating a completion message to the management system after the task has been executed on at least one of the plurality of managed systems.

21. The machine-readable medium of claim 16, wherein the method includes the agent computer analyzing the contents of the envelope and, in response thereto, selectively denying and allowing access to at least one of the plurality of managed systems identified in the envelope.

22. The machine-readable medium of claim 16, wherein the task is a system diagnostics query of at least one of the plurality of managed systems, the method including the agent computer communicating results of the query to the management system.

23. An agent computer for managing a plurality of managed systems located behind a firewall, the agent computer being external to the plurality of the managed systems and comprising:
    memory;
    a processor coupled to the memory;
    a polling module executed by the processor to periodically poll a management system located on an opposed side of the firewall with respect to the agent computer and the plurality of managed systems, and to determine if an envelope is to be communicated to the agent computer; and
    an interpretation module executed by the processor to extract a task from the envelope and to analyze the envelope to identify a communication protocol and, in response thereto, using the communication protocol, to selectively communicate the task to at least one of the plurality of managed systems for execution on the plurality of managed systems.

24. The computer of claim 23, wherein the interpretation module is to extract the task that is an executable defined by a script, and wherein the interpretation module is further to interpret the script and to communicate the executable to at least one of the plurality of managed systems.

25. The computer of claim 23, wherein the agent computer is to receive the envelope, and wherein the agent computer includes a decompiler to decompile the envelope.

26. A management system for managing a plurality of managed systems, the management system comprising:
    a processor;
    memory coupled to the processor;
    a control center, retained by the memory, at which a plurality of tasks to be executed on the plurality of managed systems are defined;
    an envelope generator, executed by the processor, to generate an envelope including at least one of the plurality of tasks;
    a systems tool, executed by the processor, to communicate the envelope to an agent computer in response to a communication from a polling module of the agent computer to the control center periodically polling the control center to determine if there is at least one envelope for the agent computer to receive; and
    the control center to task the agent computer to analyze the envelope to identify a communication protocol and, using the communication protocol, to selectively communicate the at least one of the plurality of tasks to at least one of the plurality of managed systems.

27. The system of claim 26, wherein the envelope generator is to generate the at least one of the plurality of tasks, which is an executable defined by a script provided at the control center for execution on at least one of the plurality of managed systems.

28. A method of managing a plurality of managed systems, the method comprising:
    initiating at a control center a plurality of tasks to be executed on at least one of the plurality of managed systems;
    generating at the control center an envelope including at least one of the plurality of tasks;
    communicating the envelope to an agent computer in response to a communication from a polling module of the agent computer to the control center periodically polling the control center to determine if there is at least one envelope for the agent computer to receive; and
    at the agent computer analyzing the envelope to identify a communication protocol and using the communication protocol, selectively communicating the at least one of the plurality of tasks to at least one of the plurality of managed systems, the agent computer being external to and communicatively coupled to at least one of the plurality of managed systems.

29. The method of claim 28, wherein the task comprises an executable defined by a script for execution on the agent computer.

30. The method of claim 28, which includes encrypting the envelope prior to communicating the envelope to the agent computer.

31. An agent computer for managing a plurality of managed systems located behind a firewall, the agent computer being external to the plurality of managed systems, the agent computer comprising:

storing means;

processing means coupled to the storing means;

polling means, executed by the processing means, for periodically polling a management system located on an opposed side of the firewall with respect to the agent computer and the plurality of managed systems to determine an envelope is to be communicated to the agent computer;

receiving means, executed by the processing means, for receiving the envelope and extracting a task from the envelope;

analyzing means, executed by the processing means, for analyzing the envelope to identify a communication protocol; and communicating means, executed by the processing means, for selectively communicating the task to at least one of the plurality of managed systems for execution, using the communication protocol.

* * * * *